(12) United States Patent
Chen

(10) Patent No.: US 7,891,627 B1
(45) Date of Patent: Feb. 22, 2011

(54) MOUSE PAD

(76) Inventor: Chi-Hung Chen, 3F.-5, No. 262, Sec. 2, Henan Rd., Situn District, Taichung City (TW)

( * ) Notice: Subject to any disclaimer, the term of this patent is extended or adjusted under 35 U.S.C. 154(b) by 0 days.

(21) Appl. No.: 12/700,624

(22) Filed: Feb. 4, 2010

(51) Int. Cl.
*A47B 91/00* (2006.01)
*B32B 3/00* (2006.01)

(52) U.S. Cl. .................. 248/346.01; 248/918; 428/172; 428/317.1; 15/104.93

(58) Field of Classification Search ............ 248/346.01, 248/918; 428/40.1, 101, 343, 352, 41.9, 428/317.1, 137, 304.4, 172, 350, 355 RA; 134/6, 8, 42; 15/104.93, 104.002, 104.001
See application file for complete search history.

(56) References Cited

U.S. PATENT DOCUMENTS

| 4,760,618 | A | * | 8/1988 | Chapin, Jr. | ............... | 15/104.93 |
| 5,968,644 | A | * | 10/1999 | Lai | ........................ | 428/317.1 |
| 6,383,607 | B1 | * | 5/2002 | Shin | ........................ | 428/172 |
| 6,458,442 | B1 | * | 10/2002 | McKay | ..................... | 428/40.1 |
| 2003/0129353 | A1 | * | 7/2003 | Abrams | ..................... | 428/88 |
| 2006/0188689 | A1 | * | 8/2006 | Hedley | ......................... | 428/86 |
| 2008/0111047 | A1 | * | 5/2008 | Abrams | ..................... | 248/560 |

FOREIGN PATENT DOCUMENTS

JP        2000081948 A  *  3/2000

* cited by examiner

*Primary Examiner*—Anita M King

(57) ABSTRACT

A mouse pad of the present invention includes a first layer, a second layer and a plurality of flexible supporting fibers. The first layer is parallel to the second layer, and the supporting fibers are located between the first and second layers to separate the two layers apart. Thereby, a receiving room is defined between the first and second layers. The first layer is formed with a plurality of macroscopic micro bores which communicate with the receiving room. As such, situations such as dust accumulation on the bottom of a mouse can be mitigated.

9 Claims, 3 Drawing Sheets

MOUSE PAD

BACKGROUND OF THE INVENTION

1. Field of the Invention

The present invention relates to a mouse pad.

2. Description of the Prior Art

As shown in FIG. 1, a conventional mouse pad may be a two-layer structure, mainly including a top layer 2 and a bottom layer 4. The top layer 2 has frictional and/or optical properties for a mouse to function and slide thereon. The bottom layer 4 may provide some mechanical strength to the mouse pad. However, grime is adapted to adhere to a bottom surface of a mouse working on a conventional mouse pad. Thus the mouse may have malfunction and insensitive problems, especially the wheel mouse. Such situations are really troublesome to the users.

Besides, conventional multi-layer mouse pads are mostly formed with the help of glue. Such mouse pads may have glue residuals around their peripheries, and they may tend to delaminate when the bonding of the glue is weakened as time lapses.

The present invention is, therefore, arisen to obviate or at least mitigate the above-mentioned disadvantages.

SUMMARY OF THE INVENTION

The main object of the present invention is to provide a mouse pad which helps clean a bottom surface of a mouse.

To achieve the above and other objects, a mouse pad of the present invention includes a first layer, a second layer and a plurality of flexible supporting fibers. The first layer is parallel to the second layer, and the supporting fibers are located between the first and second layers to separate the two layers apart. Thereby, a receiving room is defined between the first and second layers. The first layer is formed with a plurality of macroscopic micro bores which communicate with the receiving room.

Another object of the present invention is to provide a mouse pad which will not tend to delaminate.

To achieve the above and other objects, the first layer, the second layer and the supporting fibers of the mouse pad are integrally formed in a weaving manner and are made of polyester.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
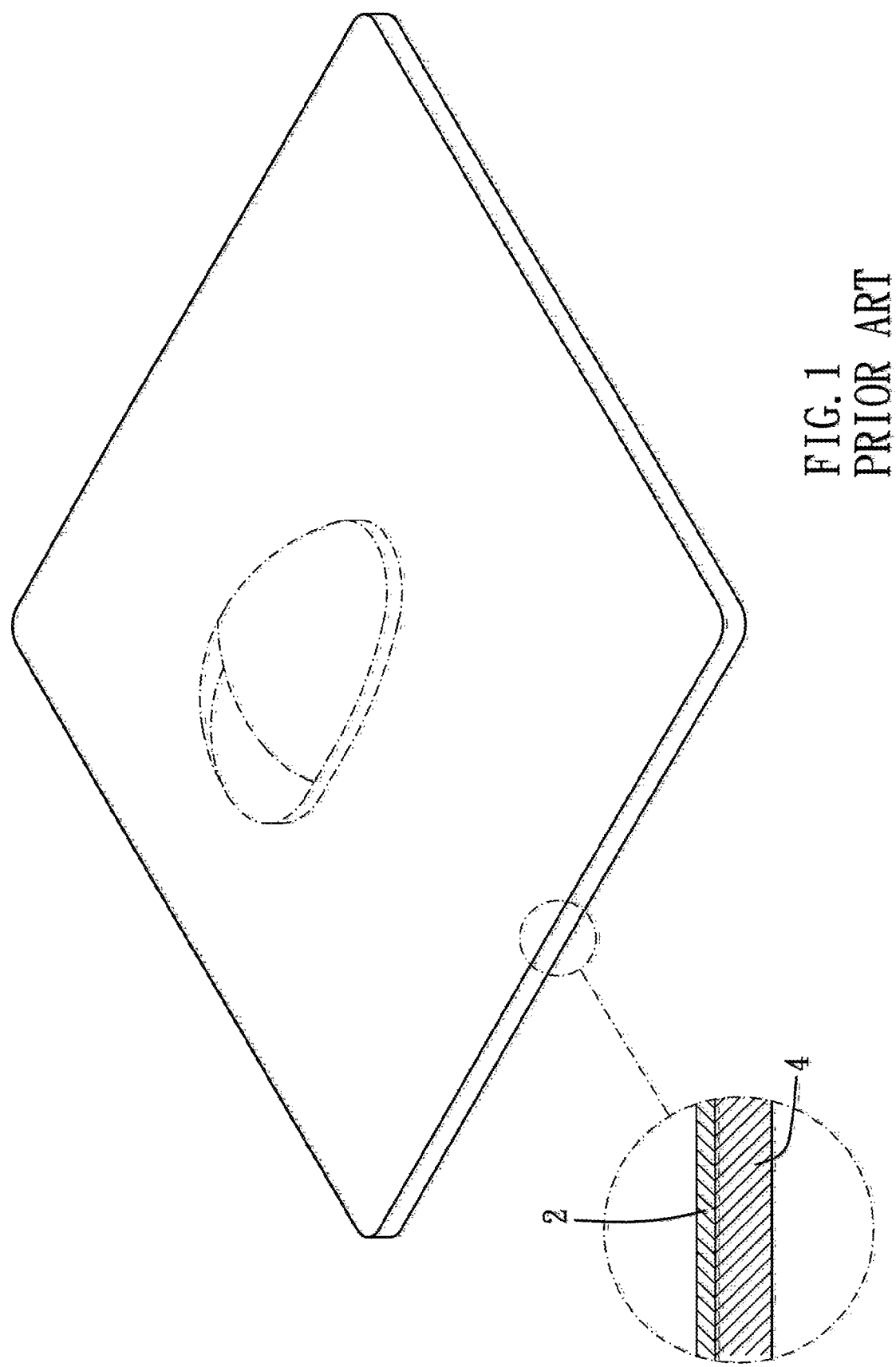
FIG. 1 is a drawing showing a mouse pad of a prior art.
Figure 2:
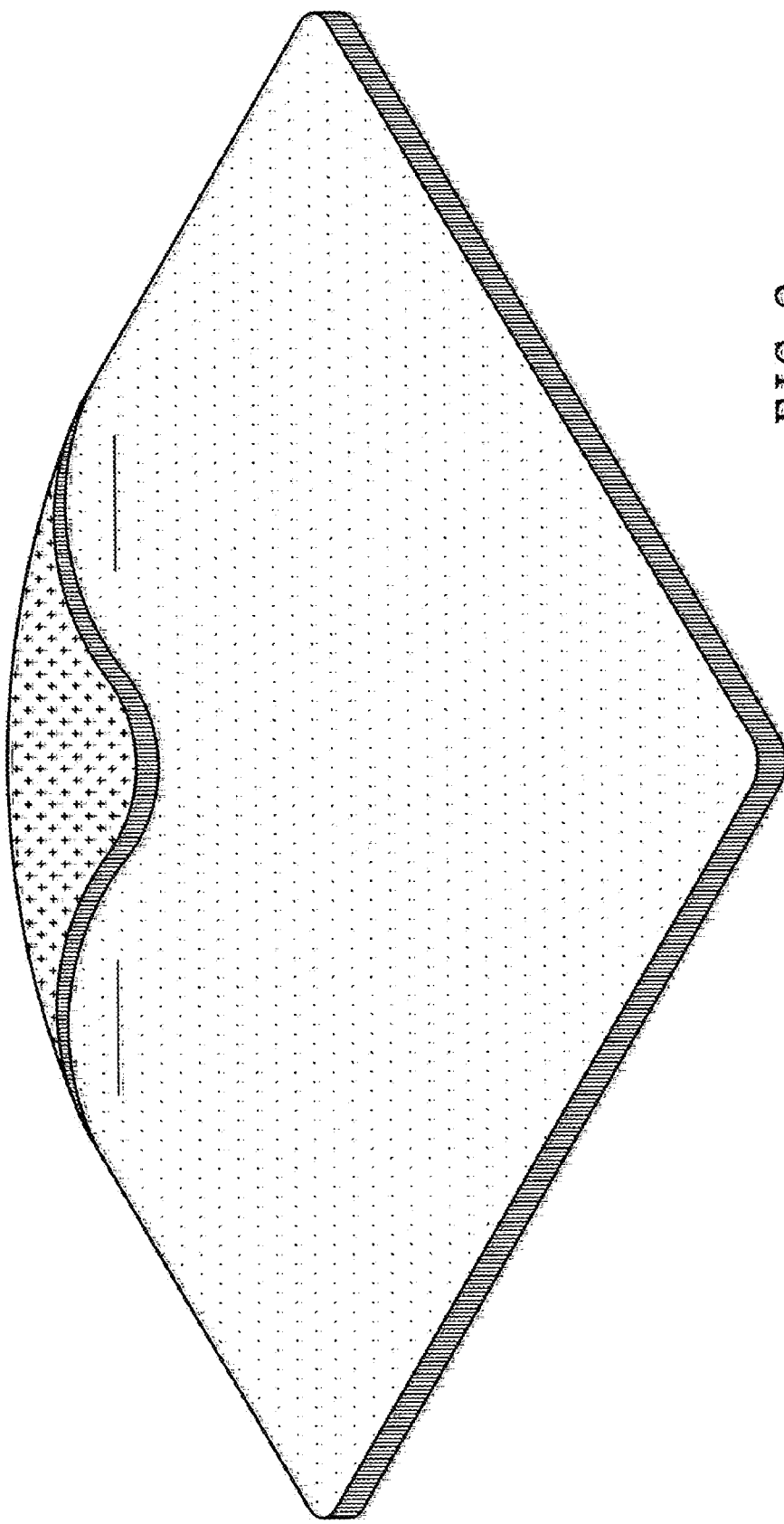
FIG. 2 is a drawing showing a mouse pad of the present invention.
Figure 3:
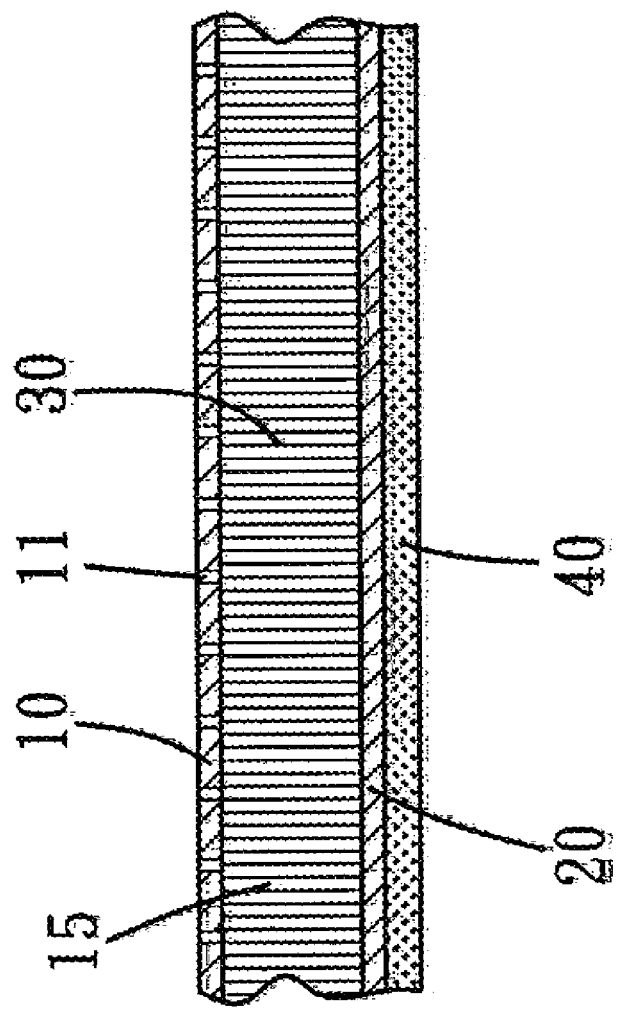
FIG. 3 is a profile showing a mouse pad of the present invention.

Please refer to FIG. 2 and FIG. 3. A mouse pad of the present invention includes a first layer 10, a second layer 20, a plurality of flexible supporting fibers 30 and an anti-skid layer 40.

The supporting fibers 30 are located between the first and second layers 10 and 20 to separate the two layers 10 and 20 apart. Thereby, a receiving room 15 is defined between the layers 10 and 20.

The first layer 10 is formed with a plurality of macroscopic micro bores 11 which communicate with the receiving room 15. Preferably, the bore diameters of the micro bores 11 are 0.05-0.25 mm, and the micro bores 11 substantially vertically penetrate the first layer 10.

When a mouse slides on the mouse pad of the present invention, the first layer 10 with micro bores 11 can work as a sieve. Because the micro bores 11 are bigger than most of the dust, the dust on the mouse pad and adhered on a bottom surface of the mouse can be wiped into the receiving room 15 via the bores 11. As such, the bottom surface of the mouse as well as the first layer of the pad is cleaned. That is, malfunctions of the mouse resulting from the grime accumulation on the bottom surface can be significantly mitigated.

To let the dust easily enter the receiving room 15, the orientations of the supporting fibers 30 are preferably perpendicular to the first and second layers 10 and 20, and the density of the fibers 30 is 100-1000 units/cm$^2$. If the density of the fibers 30 is smaller than 100 units/cm$^2$, the fibers 30 will have insufficient strength to separate the layers apart. On the other hand, if the density of the fibers 30 exceeds 1000 units/cm$^2$, the receiving room will be too crowded to receive the dust therein. Note that the supporting fibers may also be designed into wavy shape, cross shape or triangular shape.

Moreover, the first layer 10, the second layer 20 and the supporting fibers 30 are preferably made of polyester and are integrally formed in a weaving manner. For instance, the first layer and the second layer can be a warp-knit, weft-insert fabric or a warp-insert, weft knit fabric. The supporting fibers can be the warp and/or weft knitted between the two layers.

By means of weaving, the mouse pad of the present invention can be made without glue. In other words, no glue residual will be found on the mouse pad of the present invention, and the delaminating problems of the conventional mouse pads can be, therefore, obviated.

The anti-skid layer 40 is disposed on a surface of the second layer 20 away from the first layer 10. More specifically, the anti-skid layer 40 can by applied on that surface by spraying manner, printing manner or other conventional coating manners. Preferably, the anti-skid layer 40 may have grooves to increase friction. The anti-skid layer 40 may also have self-stickiness property, thus it can be made from polyurethane or silicone.

Furthermore, the disposal of supporting fibers makes the mouse pad have cushioning property, and thus the mouse pad of the present invention can also work as a cushion pad. For instance, when carrying a notebook computer with a bag, the mouse pad can be placed in the bag to absorb compacts, so as to protect the notebook computer.

What is claimed is:

1. A mouse pad, comprising:
    a first layer;
    a second layer parallel to the first layer;
    a plurality of flexible supporting fibers, located between the first and second layers to separate the two layers apart, whereby a receiving room is defined between the first and second layers;
    wherein the first layer is formed with a plurality of macroscopic micro bores which communicate with the receiving room.

2. The mouse pad of claim 1, wherein bore diameters of the micro bores are 0.05-0.25 mm.

3. The mouse pad of claim 1, wherein the first layer is a woven layer.

4. The mouse pad of claim 1, wherein the first layer, the second layer and the supporting fibers are integrally formed in a weaving manner.

5. The mouse pad of claim 1, wherein the first layer, the second layer and the supporting fibers are made of polyester.

6. The mouse pad of claim 1, further comprising an anti-skid layer, disposed on a surface of the second layer away from the first layer.

7. The mouse pad of claim 1, wherein orientations of the supporting fibers are substantially perpendicular to the first and second layers.

8. The mouse pad of claim 1, wherein a density of the supporting fibers is 100-1000 units/cm$^2$.

9. The mouse pad of claim 1, wherein the micro bores substantially vertically penetrate the first layer.

* * * * *